United States Patent [19]

Anderson et al.

[11] 4,068,294
[45] Jan. 10, 1978

[54] CIRCUIT FOR DETECTING A MISSED COMMUTATION IN AN INVERTER

[75] Inventors: Thomas E. Anderson; Steven C. Peak, both of Normal; Ole N. Ibsen, Bloomington, all of Ill.

[73] Assignee: General Electric Company, New York, N.Y.

[21] Appl. No.: 724,817

[22] Filed: Sept. 20, 1976

[51] Int. Cl.² .................... H02M 1/18; H02M 7/515
[52] U.S. Cl. .................................. 363/58; 363/96; 363/136
[58] Field of Search .................. 321/11, 12, 13, 14, 321/18, 45 R, 45 C; 363/50, 56, 57, 58, 96, 135, 136

[56] References Cited

U.S. PATENT DOCUMENTS

| 3,418,556 | 12/1968 | Greenberg et al. | 321/45 R X |
|---|---|---|---|
| 3,423,665 | 1/1969 | Greenberg et al. | 321/45 R X |
| 3,718,853 | 2/1973 | Graf | 321/12 |
| 3,760,258 | 9/1973 | Percorini et al. | 321/11 |
| 3,821,630 | 6/1974 | Kornrumpf et al. | 321/12 X |
| 3,824,441 | 7/1974 | Heyman et al. | 321/18 X |
| 3,846,694 | 11/1974 | Archer | 321/18 |
| 3,919,620 | 11/1975 | McMurray et al. | 321/13 |

*Primary Examiner*—William M. Shoop
*Attorney, Agent, or Firm*—Stephen A. Young; Walter C. Bernkopf; Robert A. Cahill

[57] ABSTRACT

A circuit for detecting a missed commutation in an inverter. The circuit includes means coupled to the center tap of a commutating interval current limiting reactor which is connected in series with and interposed between a pair of gate controlled rectifiers for generating a first signal upon detecting and for the duration of an interval when both of the rectifiers are ON. The circuit further provides means, responsive to a first pulse used to initiate an interval when either of the pair of rectifiers is to be "ON", for generating a second signal. Also provided is a means responsive to the first and second signals for generating a control signal to cause cessation of the operation of the inverter, if the first signal is absent during the total occurrence of the second signal.

5 Claims, 9 Drawing Figures

CIRCUIT FOR DETECTING A MISSED COMMUTATION IN AN INVERTER

BACKGROUND OF THE INVENTION

1. Field of the Invention

This invention relates to a circuit for providing rapid detection of a malfunction in an inverter circuit of the type used in an uninterruptible power system in order to enable the inverter circuit to be turned off or shut down and the uninterruptible power system to be quickly removed from a critical bus.

2. Description of the Prior Art

Self-commutating inverter circuits of the type described in U.S. Pat. No. Re. 26,342 and assigned to the same assignee as the assignee of the present invention have been used in uninterruptible power systems. These uninterruptible power systems are capable of converting a DC voltage to an AC voltage so as to provide a reliable AC power source to a critical bus, which bus in turn provides power to a critical load, such as a computer. This critical load must have a voltage source which dos not deviate in amplitude or frequency from very tight specifications in order to insure its proper operation. Thus, quite often a number or a plurality of uninterruptible power systems are used in redundant fashion to supply the critical bus and load. If, however, there is a malfunction in the inverter of any UPS system, this inverter can adversely effect the overall voltage of the critical bus, thereby endangering the continued operation of computers which receive their power from that bus. One such frequent malfunction which can occur within an inverter circuit used in a UPS system can result when one of the rectifiers in a leg of the self-commutating inverter circuit does not turn ON at a time when it is supposed to be ON. This condition can ultimately result in a shift in the output voltage or possibly the frequency of the total UPS system from its desired value.

OBJECTS OF THE INVENTION

It is therefore an object of this invention to provide a circuit for detecting a malfunction in an inverter circuit used in a UPS system so as to enable the converter to immediately be shut down, which would in turn aid in the rapid removal of the UPS system from the critical bus.

It is also an object of this invention to provide a circuit for detecting a missed commutation of a thyristor in a leg of the self-commutating inverter to enable the generation of a signal to cause shut down of the inverter.

Other objects of the invention will be pointed out hereinafter.

SUMMARY OF THE INVENTION

According to a broad aspect of the invention, there is provided a circuit for detecting a malfunction in a self-commutating inverter. The circuit includes means, coupled to the center tap of a commutating interval current limiting reactor which is connected in series with and interposed between a pair of gate controlled rectifiers, for generating a first signal upon detecting and for a duration of an interval when both of the rectifiers are on. The circuit further provides means, responsive to a first pulse to initiate an interval when either of the pair of rectifiers is to be on, for generating a second signal. Also provided is means responsive to the first and second signals for generating a control signal to cause cessation of the operation of the inverter if the first signal is absent during the total occurrence of the second signal.

The means for generating the first signal is comprised of a voltage divider network, full wave rectifier means, a photodiode and a phototransistor amplifier. One input terminal of the rectifier means is connected to the center tap of the reactor, and the other input terminal of the rectifier means is connected to the midpoint of the voltage divider. The photodiode is connected across the output terminal of the rectifier means, and the phototransistor amplifier is optically coupled to the photodiode. During the time when both of the rectifiers are on, the potential at the midpoint of the voltage divider is equal to the potential at the center tap of the reactor, and no current flows through the photodiode, thereby resulting in the generation of a first signal at the output terminal of the phototransistor amplifier. During the remaining time interval when only one of the first and second gate controlled rectifiers is on, the potential at the center tap of the reactor is unequal to the potential at the midpoint of the voltage divider, thereby causing the flow of current through the photodiode, whereupon the first signal at the output of the phototransistor amplifier is extinguished.

The means for generating the second signal is comprised of a one-shot multivibrator that is triggered by the first pulse.

The means for generating the control signal is comprised of an inverting amplifier that is coupled to the output of the one-shot multivibrator, a flip-flop that is set by the first pulse and that is reset by the leading edge of the first signal from the phototransistor amplifier, and gating means that is coupled to the output of the inverting amplifier and the output of the flip-flop, whereby the control signal is generated at the output terminal of the gating means, if the flip-flop fails to be reset during the total occurrence of the second signal at the output of the one-shot multivibrator.

BRIEF DESCRIPTION OF THE DRAWINGS

FIG. 3c is a timing diagram of the first pulse of gating signals derived from the waveform shown in FIG. 3a;

DESCRIPTION OF THE PREFERRED EMBODIMENT

Figure 1:
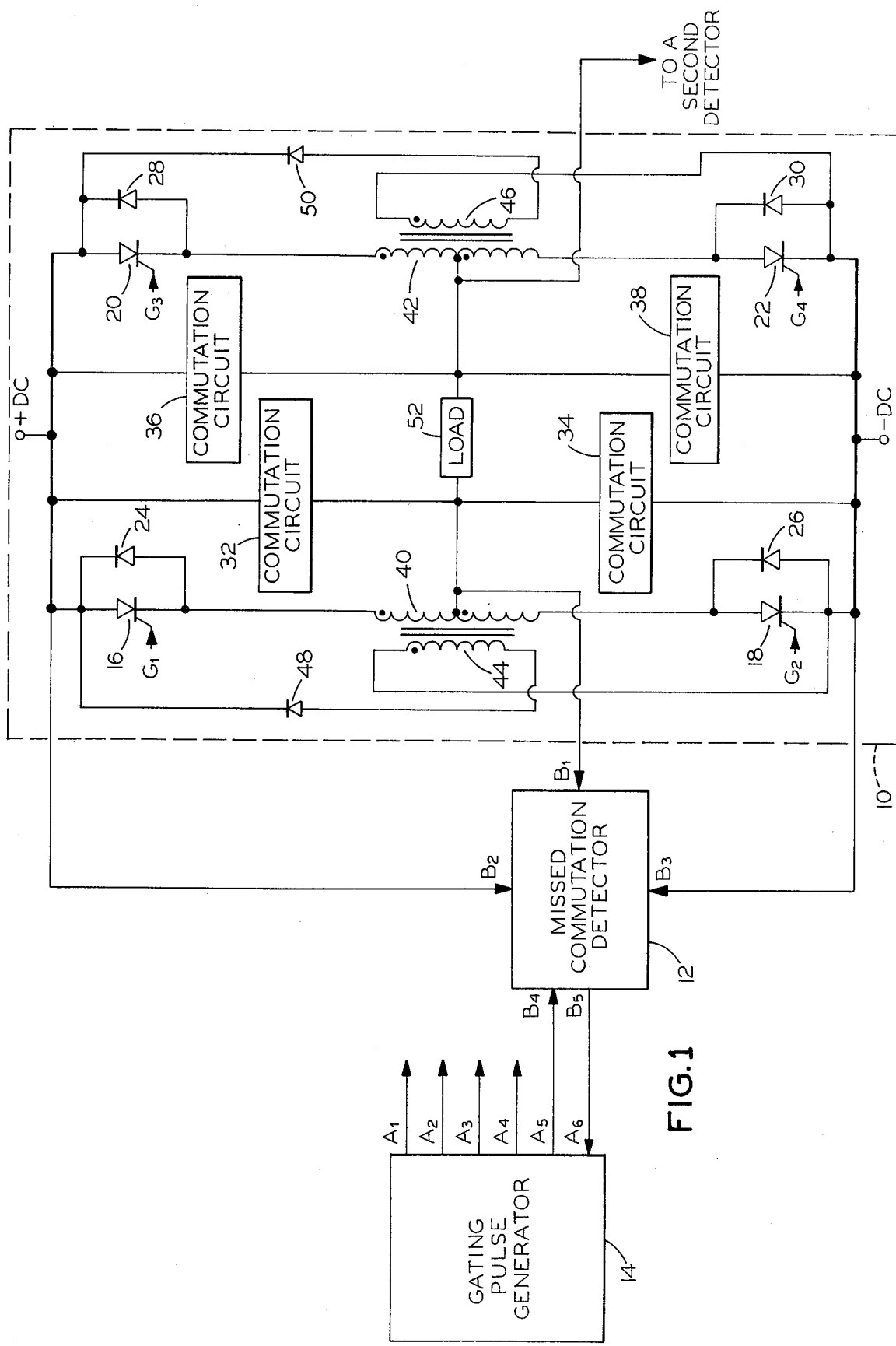
FIG. 1 is an overall circuit diagram of the circuit for detecting a malfunction in a self-commutating inverter.
Figure 2:
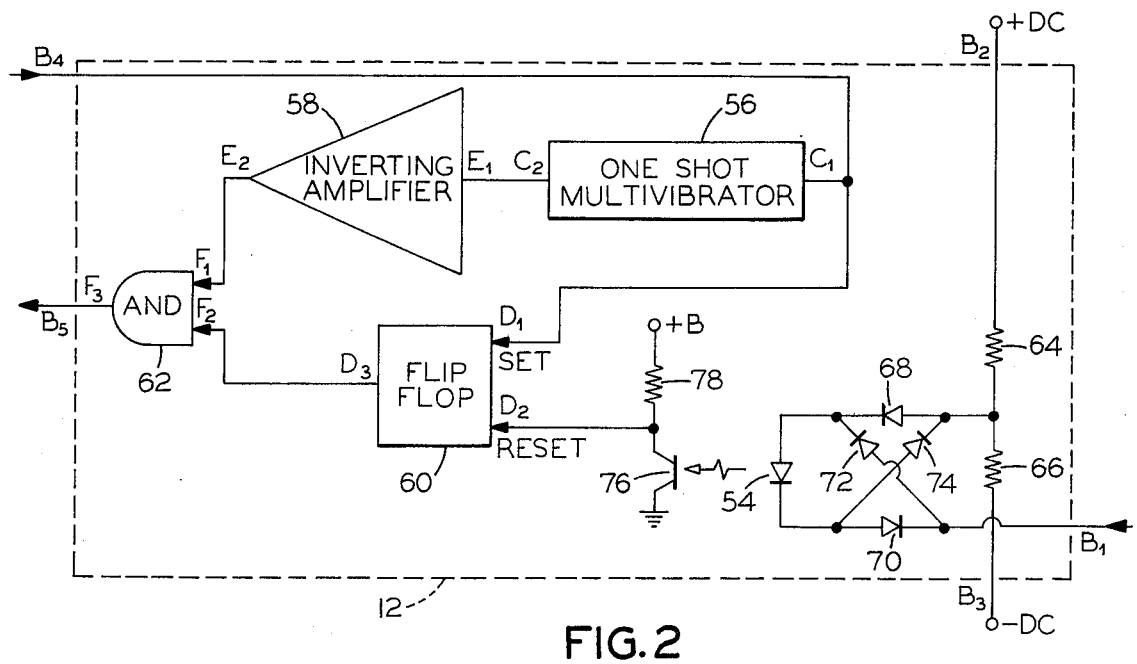
FIG. 2 is a more detailed diagram of the missed commutating detector shown in FIG. 1.

Referring to FIGS. 1-3, the invention will now be explained. As shown in FIG. 1, there is provided a self-commutating inverter circuit 10, a missed commutation detector 12, and a gating pulse generator 14.

Inverter circuit 10 is comprised of first and second gate controlled SCR's 16 and 18 within one leg of the inverter circuit and third and fourth gate controlled SCR's 20 and 22 in another leg of the inverter circuit, first, second, third and fourth diodes 24, 26, 28 and 30, first, second, third and fourth commutation circuits 32, 34, 36 and 38, first and second current limiting (spanning) reactors 40 and 42, first and second secondary windings 44 and 46 and first and second blocking diodes 48 and 50. Diodes 24, 26, 28 and 30 are respectively connected in anti-parallel relationship across respective SCR's 16, 18, 20 and 22. Reactor 40 is connected between the cathode of SCR 16 and the anode of SCR 18, while reactor 42 is connected between the cathode of SCR 20 and the anode of SCR 22. The anodes of SCR's 16 and 20 are electrically connected to the +D.C. terminal of a D.C. power supply (not shown), while the cathodes of SCR's 18 and 22 are electrically connected to the −D.C. terminal of the D.C. power supply. Commutation circuits 32 and 36 are electrically connected to the +D.C. terminal and the center taps of respective reactors 40 and 42, while commutation circuits 34 and 38 are electrically connected to the −D.C. terminal and the center taps of respective reactors 40 and 42. Secondary windings 44 and 46 are respectively inductively coupled as shown in FIG. 1 to respective reactors 40 and 42, wherein one end of secondary windings 44 and 46 are electrically connected to the −D.C. terminal, while the other end of windings 44 and 46 are connected to the respective anodes of blocking diodes 48 and 50. The cathodes of blocking diodes 48 and 50 are electrically connected to the +D.C. terminal. The center tap of respective reactors 40 and 42 provides an effective output terminal for each leg of the inverter, and a load 52 is connected between the respective center tap terminals of reactors 40 and 42.

Respective gate terminals $G_1$, $G_2$, $G_3$ and $G_4$ of respective SCR's 16, 18, 20 and 22 are electrically connected to receive gating pulses from respective output terminals $A_1$, $A_2$, $A_3$ and $A_4$ of gating pulse generator 14. The pulses shown in FIG. 3d would, for example, be applied from terminals $A_1$ and $A_4$ of gating pulse generator 14 to respective gating terminals $G_1$ and $G_4$ of SCR's 16 and 22 so that these SCR's would be switched ON during time pulses $T_1$ and $T_3$ shown in FIG. 3a, while gating pulses shown in FIG. 3e would be applied from terminals $A_2$ and $A_3$ of gating pulse generator 14 to respective gating terminals $G_2$ and $G_3$ of respective SCR's 18 and 20 so that these SCR's would be switched ON during period $T_2$ shown in FIG. 3a.

A more detailed description with regard to the circuit details and operation of inverter circuit 10 is shown in U.S. Pat. No. Re. 26,342 assigned to the same assignee as the assignee of the present invention. Also, a further description of gating sources used to generate desired gating pulses, shown in FIGS. 3d and 3e, in accordance with the desired SCR switching waveform shown in FIG. 3a, to be applied to the gates $G_1$, $G_2$, $G_3$ and $G_4$ of respective SCR's 16, 18, 20 and 22, can be found in Chapter 4 of The Silicon Controlled Rectifier Manual, Second Edition, published by the General Electric Company in 1961.

Figure 3A:
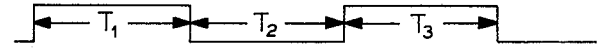
FIG. 3a is a timing diagram of the desired SCR switching waveform for the inverter circuit.
Figure 3B:
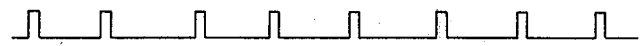
FIG. 3b is a timing diagram of an asynchonized randomly generated pulse train generated within the gating pulse generator.
Figure 3C:
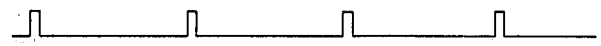

Referring again to FIG. 1, the center tap terminal of reactor 40 is electrically connected to an input terminal $B_1$ of missed commutation detector 12, wile the +D.C. terminal and the −D.C. terminal are electrically connected to respective input terminals $B_2$ and $B_3$ of the missed commutation detector. What is defined as a first pulse, which is shown in FIG. 3c, has its leading edge derived from a point in time when it is desired that one of the two SCR's in an inverter leg is to be triggered ON to initiate a commutation cycle. The first pulses are thus derived within gating pulse generator 14 from each transition in the waveform shown in FIG. 3a, using standard pulse generation techniques, and are coupled from an output terminal $A_5$ of the gating pulse generator to an input terminal $B_4$ of missed commutation detector 12. Missed commutation detector 12 provides a means for generating a control signal at an output terminal $B_5$ which is coupled to an input terminal $A_6$ of gating pulse generator 14, to cause a cessation in the generation of trigger pulses to the gates of the SCR's of inverter circuit 10 to shut the inverter down when a malfunction hereinafter described is detected within the self-commutating inverter circuit.

As shown in FIG. 2, missed commutation detector 12 is comprised of a full wave rectifier, a photodiode 54, a phototransistor amplifier, a one-shot multivibrator 56, an inverting amplifier 58, a set-reset flip-flop 60 and an AND gate 62. The voltage divider is comprised of respective first and second resistors 64 and 66 connected together at a midpoint or output terminal of the voltage divider. That terminal of resistor 64 which is not connected to resistor 66 is connected, via terminal $B_2$ of the missed commutation detector, to the +D.C. terminal of the power supply, while that terminal of resistor 66 which is not connected to resistor 64 is connected, via terminal $B_3$ of the missed commutation detector, to the −D.C. terminal of the power supply. The full wave rectifier is comprised of diodes 68, 70, 72 and 74. The cathode of diode 74 is electrically connected to the anode of diode 68 to form one input terminal of the full wave rectifier which is electrically connected to the output terminal of the voltage divider. The anode of diode 72 is electrically connected to the cathode of diode 70 to form a second input terminal of the full wave rectifier which is electrically connected, via terminal $B_1$ of the missed commutation detector, to the center tap of spanning reactor 40. The cathodes of diodes 68 and 72 are electrically connected together to form one output terminal of the full wave rectifier which is electrically connected to the anode of the photodiode 54. The anodes of diodes 74 and 70 are electrically connected together to form a second output terminal of the full wave rectifier which is electrically connected to the cathode of photodiode 54. The phototransistor amplifier is comprised of a phototransistor 76 and a resistor 78. The base of phototransistor 76 is optically coupled to photodiode 54, while the emitter of the phototransistor is electrically connected to the circuit ground, and the collector of the phototransistor is electrically connected via resistor 78 to a +D.C. terminal of the power supply. The first pulse is applied via an electrical connection from output terminal $A_5$ of the gating pulse generator through terminal $B_4$ of missed commutation detector 12 to an input terminal $C_1$ of one-shot multivibrator 56 and a set input terminal $D_1$ of flip-flop 60. An output terminal $C_2$ of the one-shot ultivibrator 56 is electrically connected to an input terminal $E_1$ of inverting amplifier 58 which inverts the level of the signal received at its input from high to low and low to high. The inverted signal is applied from an output terminal $E_2$ of the inverting amplifier to one input terminal $F_1$ of AND gate 62, while the collector of phototransistor 74 is electrically connected to a reset input terminal $D_2$ of flip-flop 60, and an output terminal $D_3$ of the flip-flop is electrically connected to another input terminal $F_2$ of AND gate 62. The application of the first pulse to set input terminal $D_1$ of flip-flop 60 will cause the generation of a high level signal at output terminal $D_3$ of the flip-flop, while the application of a high level signal from the phototransistor amplifier to reset input terminal $D_2$ of the flip-flop causes the generation of a low level (zero potential) signal at output terminal $D_3$ of flip-flop 60. When high signal levels are applied at both input terminals $F_1$ and $F_2$ of AND gate 62, a control signal is generated at an output terminal $F_3$ of the AND gate, and is coupled, via terminal $B_5$ of the missed commutation detector, to input terminal $A_6$ of the gating pulse generator to cause discontinuance of the generation of the gating pulses to be applied to the SCR's of inverter circuit 10, thereby causing shut down of the inverter circuit. This dicontinuance of generation of pulses within gating pulse generator 14 can be accomplished by simply using the control signal received at input terminal $A_6$ to control an electronic switch, such that when the control signal is applied to the electronic switch, it causes an interruption in the flow of power to the pulse generating circuits, and, if desired, to an uninterruptible power system (UPS).

The overall circuit operation will now be explained. Once the desired output of the self-commutating inverter circuit is determined, the length of the time periods when SCR's 16 and 22 are to be ON, and then when SCR's 18 and 20 are to be ON, will correspond to the waveform shown in FIG. 3a, wherein time periods T1 and T3 correspond to the period when SCR's 16 and 22 are ON, and the period T2 corresonds to the time when SCR's 18 and 20 are to be ON. Using the leading and trailing edges of the waveform shown in FIG. 3a, first pulses shown in FIG. 3c are generated using standard pulse generating techniques, wherein the leading edge of the first pulses coincides with the leading and trailing edge of the waveform shown in FIG. 3a. Gating pulse generator 14 can also provide (using standard pulse generating techniques) a randomly generated asynchronized pulse train as shown in FIG. 3b, wherein the pulse train can be combined with the first pulse generated in FIG. 3c, and using standard gating techniques, the pulse train shown in FIG. 3d can be applied to SCR's 16 and 22, while the pulse train shown in FIG. 3e can be applied to SCR's 18 and 20.

Figure 3D:
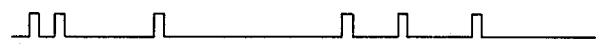
FIG. 3d is a timing diagram of the gating pulses to be applied to the gate of one SCR of each inverter leg.
Figure 3E:
FIG. 3e is a timing diagram of the gating pulses to be applied to the gate of the other SCR of each inverter leg.
Figure 3F:
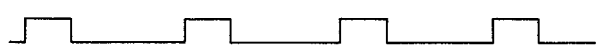
FIG. 3f is a timing diagram of the output signal generated by the one-shot multivibrator in response to a first pulse.
Figure 3G:
FIG. 3g is a timing diagram of the output of a phototransistor amplifier which shows the generation of pulses during an interval when both SCR's within an inverter leg are "ON", which interval is referred to as a spanning interval.

Assuming that SCR's 18 and 20 have been ON for a period of time, as soon as the first pulse of the pulse train shown in FIG. 3d is applied to the gate terminals of SCR's 16 and 22, these SCR's turn ON. Once SCR 16 is ON and SCR 18 has not yet been commutated OFF, the full voltage from the D.C. power supply is applied across spanning reactor 40 wherein the potential at the center tap of reactor 40 is half the voltage across reactor 40. At this time, it should be noted that the value of resistors 64 and 66 of the voltage divider are selected so that the voltage potential at the midpoint or output of the voltage divider would be equal the voltage potential at the center tap of the spanning reactor when the full voltage from the D.C. power supply as applied across the spanning reactor. As soon as the potential at the center tap of reactor 40 is equal to the potential at the output of the voltage divider, the voltage across the input and output terminals of the full wave rectifier is zero, and no current flows through photodiode 54. While no current is flowing through photodiode 54, phototransistor 74 is off, and a high level (D.C. potential) or first signal (shown in FIG. 3g) is applied from the collector of phototransistor 74 to reset input terminal $D_2$ of flip-flop 60. At the same time that the first pulse is applied to the gate terminals of SCR's 16 and 22, it is also applied to input terminal $C_1$ of one-shot multivibrator 56, which causes a second signal (shown in FIG. 3f) to be generated at its output terminal $C_2$.

The duration of this second signal is set so that it is shorter than the total time when both SCR's 16 and 18 remain "ON", but longer than the time normally necessary to insure that both SCR's 16 and 18 are already "ON". The time when both SCR's 16 and 18 remain ON, and the full D.C. supply voltage is applied across the spanning reactor, is known as the spanning interval. The time necessary for SCr 18, under these circumstances, to commutate OFF and its commutation circuit to be charged for a latter commutating cycle is known as the commutation interval. Generally, the spanning interval is one-tenth the time of the commutation interval.

Also at the same time, the first pulse is applied to set input terminal $D_1$ of flip-flop 60 to cause the generation of a high level enabling signal at output terminal $D_3$ of the flip-flop prior to the application of the first signal to reset input terminal $D_2$ of the flip-flop from the output of the phototransistor amplifier. It is necessary that flip-flop 60 be set by a first pulse prior to being reset by a first signal which indicates that a spanning interval is occurring. The reason for this is that if the first pulse does not set the flip-flop, the output of the flip-flop will remain at a low level from being reset by a first signal from a previous commutation interval, thereby continuously disabling AND gate 62. Thus, if no subsequent spanning interval occurs, i.e. missed commutation, AND gate 62 will continue to be disabled, and no control signal, indicating a missed commutation, could be generated.

The second signal generated at the output of one-shot multivibrator 56 is applied to the input of inverting amplifier 58, and for the duration of the second signal, a low (zero potential) level disabling signal is applied from the output of inverting amplifier 58 to input terminal $F_1$ of AND gate 62 to prevent a control signal from being generated at output terminal $F_3$ of AND gate 62 during the time between the setting of flip-flop 60 by the first pulse and the resetting of the flip-flop by the first signal. Now, at the end of the spanning interval, when SCR 18 is commutated OFF, the potential at the center tap of the spanning reactor is no longer equal to the potential at the output of the voltage divider, and therefore, a voltage differential appears across the input terminals of the full wave rectifier. This causes current to flow through photodiode 54, which, in turn, causes phototransistor 74 to turn ON and the voltage at its collector to be at a low (circuit ground) signal level. After flip-flop 60 has been reset by the first signal and the output of the flip-flop falls to a low level to cause a disabling signal to be applied to input terminal $F_2$ of AND gate 62, the second (high level) signal, generated at the output of the multivibrator in response to the first pulse, extinguishes, and the signal level at output terminal $C_2$ of multivibrator 56 becomes approximately zero. This zero (low) level signal is inverted by inverting amplifier 58, which applied a high level enabling signal to input terminal $F_1$ of AND gate 62. However, since the signal applied to terminal $F_2$ has already returned to a disabling low level, the signal at output terminal $F_3$ of AND gate 62 is still at a low level. This indicates that in the course of a commutation cycle, the "OFF" SCR in one leg of the inverter has been successfully turned ON within the usual time following the application of a first pulse to the OFF SCR, and therefore, no fault is detected and no disabling control signal is generated at the output of AND gate 62. However, if a first signal is not generated in time to reset flip-flop 60 before the second signal at the output of multivibrator 56 is extinguished, high level enabling signals will be applied to input terminals $F_1$ and $F_2$ of AND gate 62. This will cause generation of a control signal at output terminal $F_3$ of AND gate 62, which will be applied to gating pulse generator 14 to cause the previously described shut down of inverter circuit 10. Thus, the generation of a control signal at the output of AND gate 62 will provie an indication that a missed commutation in an inverter leg has been detected after a first pulse has been applied to the OFF SCR in that inverter leg.

Thus, the circuit described in this application provides early detection of a malfunction in the operation of the inverter circuit, which malfunction is caused by the failure of an OFF SCR in an inverter leg to turn ON in response to a first pulse applied to the gate of the OFF SCR. The resulting generation of the control (shut down) signal provides an early indication that the actual output waveform of the inverter circuit is not going to conform to the desired waveform. Upon this early detection of the missed commutation of an OFF SCR in an inverter leg, a UPS system, which utilizes this inverter, can be removed quickly from operation before it causes a serious problem to a critical load that is being supplied by the UPS system.

While the invention has been described with reference to a specific self-commutating inverter, it should be understood that other types of inverters could satisfactorily be used.

Although this invention has been described with reference to a specific embodiment thereof, numerous modifications are possible without departing from the invention, and it is desirable to cover all modifications falling within the spirit and scope of this invention.

What we claim as new and desired to secure by Letter Patent of the United States is:

1. A circuit for detecting a missed commutation in a self-commutating inverter including a series combination of at least first and second gate controlled rectifiers and a commutating interval current limiting center tapped reactor connected in series with and interposed between said rectifiers, and commutating means connected to the center tap of said reactor, said series combination being connected across a direct current source of potential, comprising:
   a. means coupled to the center tap of said reactor for generating a first signal upon detecting and for the duration of an interval when both of said rectifiers are ON;
   b. means, responsive to a first pulse used to initiate the interval when either of said first and second recitifiers is to be ON, for generating a second signal the duration of which is longer than the time necessary to ensure that both of said rectifiers would normally have turned ON but shorter than the final time when both of said rectifiers would still have remained ON; and
   c. means responsive to said first and second signals for generating a control signal to cause cessation in the operating of said inverter if said first signal fails to occur during the total occurrence of said second signal.

2. A circuit for detecting a malfunction in a self-commutating inverter according to claim 1, wherein said means for generating said first signal is comprised of:
   a. a voltage divider network having an output terminal at a midpoint junction of said voltage divider and a pair of external terminals connected across the direct current source of potential;
   b. full wave rectifier means having a pair of input and a pair of output terminals, one of said input terminals being connected to the center tap of said reactor and the other of said input terminals being connected to said output terminal of said voltage divider;
   c. a photodiode connected across said output terminals of said full wave rectifier means; and
   d. a phototransistor amplifier, optically coupled to said photodiode, having an output terminal coupled to said control signal generating means, whereby during the time when both of said gate controlled rectifiers are "ON", the potential at said output terminal of said voltage divider is equal to the potential at the center tap of said reactor, and no current flows through said photodiode, thereby resulting in the generation of said first signal at said output terminal of said phototransistor amplifier, and during the remaining time interval when only one of said first and second gate controlled rectifiers is "ON", the potential at the center tap of said reactor is unequal to the potential at said output terminal of said voltage divider, thereby causing the flow of current through said photodiode, whereupon said first signal at said output terminal of said phototransistor amplifier is extinguished.

3. A circuit for detecting a malfunction in a self-commutating inverter according to claim 1, wherein said means for generating said second signal is comprised of a one-shot multivibrator triggered by the first pulse, said mulivibrator having an output terminal.

4. A circuit for detecting a malfunction in a self-commutating inverter according to claim 3, wherein said means for generating said control signal is comprised of:
   a. an inverting amplifier having an input terminal, coupled to said output terminal of said one-shot multivibrator, and an output terminal;
   b. a flip-flop having set and reset input terminals and an output terminal, said set input terminal receiving the first pulse to set said flip-flop, and said reset input terminal being coupled to said output terminal of said phototransistor amplifier to cause said flip-flop to be reset by the leading edge of said first signal; and
   c. gating means having a first input terminal coupled to said output terminal of said flip-flop, a second input terminal coupled to said output terminal of said inverting amplifier, and an output terminal, whereby said control signal is generated at said output terminal of said gating means, if said flip-flop fails to be reset during the total occurrence of said second signal at said output terminal of said one-shot multivibrator.

5. A circuit for detecting a missed commutation in an inverter including a series combination of at least first and second gate controlled rectifiers, and commutating means coupled to each of said rectifiers, said series combination being connected across a direct current source of potential, comprising:
a. means coupled to said inverter for generating a first signal upon detecting and for the duration of an interval when both of said rectifiers are ON;
b. means, responsive to a first transition used to initiate the interval when either of said first and second rectifiers is to be ON, for generating a second signal the duration of which is longer than the time necessary to ensure that both of said rectifiers would normally have turned ON but shorter than the final time when both of said rectifiers would have remained ON; and
c. means responsive to said first and second signals for generating a control signal to cause a modification in the operation of said inverter if said first signal fails to occur during the total occurrence of said second signal.

* * * * *